(12) United States Patent
Link et al.

(10) Patent No.: US 7,608,140 B2
(45) Date of Patent: Oct. 27, 2009

(54) INKJET INKS CONTAINING AZO PYRAZOLOBENZOPYRIMIDINEONE CLASS OF COLORANTS

(75) Inventors: Steven G. Link, Rochester, NY (US); Joan C. Potenza, Rush, NY (US); Paul A. Loncle, Rochester, NY (US); Donald R. Diehl, Rochester, NY (US); Shari L. Eiff, Rush, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/031,766

(22) Filed: Feb. 15, 2008

(65) Prior Publication Data
US 2009/0205533 A1 Aug. 20, 2009

(51) Int. Cl.
C09D 11/02 (2006.01)
B41J 2/01 (2006.01)

(52) U.S. Cl. ............... 106/31.48; 106/31.46; 106/31.5; 106/31.76; 106/31.77; 106/31.78; 347/100

(58) Field of Classification Search .............. 106/31.48, 106/31.46, 31.5, 31.76, 31.77, 31.78; 534/752; 347/100
See application file for complete search history.

(56) References Cited

U.S. PATENT DOCUMENTS

| | | | | |
|---|---|---|---|---|
| 4,419,289 | A * | 12/1983 | Fleischer et al. | 534/752 |
| 5,026,427 | A | 6/1991 | Mitchell et al. | 106/31.6 |
| 5,086,698 | A | 2/1992 | Wirz | 101/409 |
| 5,141,556 | A | 8/1992 | Matrick | 106/31.58 |
| 5,160,370 | A | 11/1992 | Suga et al. | 347/100 |
| 5,169,436 | A | 12/1992 | Matrick | 106/31.58 |
| 6,001,161 | A | 12/1999 | Evans et al. | 106/31.48 |
| 6,464,767 | B1 | 10/2002 | Evans et al. | 106/31.48 |
| 6,468,338 | B1 | 10/2002 | Evans et al. | 106/31.48 |
| 6,582,502 | B2 * | 6/2003 | Fujiwara | 106/31.48 |
| 6,855,195 | B2 * | 2/2005 | Nishita et al. | 106/31.48 |
| 7,056,375 | B2 * | 6/2006 | Potenza et al. | 106/31.5 |

FOREIGN PATENT DOCUMENTS

JP 3-241858 B2 12/2001

JP 2005-082670 A 3/2005

OTHER PUBLICATIONS

D.E. Bugner and C. Suminski, "Filtration and Reciprocity Effects on the Fade Rate of Inkjet Photographic Prints", Proceedings of IS&T's NIP16: International Conference on Digital Printing Technologies, Vancouver, BC, Oct. 2000.

* cited by examiner

*Primary Examiner*—Helene Klemanski
(74) *Attorney, Agent, or Firm*—Lynn M. Blank; Arthur E. Kluegel; Andrew J. Anderson

(57) ABSTRACT

The present invention relates to an aqueous ink comprising at least water, and a colorant of Formula 1

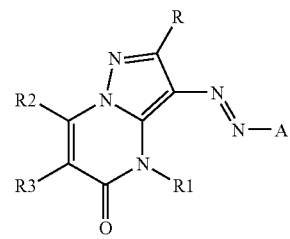

wherein A is any substituted or unsubstituted aromatic or heteroaromatic moiety; R is hydrogen or any non-metallic group; R1 is hydrogen, or any substituted or unsubstituted aryl, alkenyl, alkynyl or alkyl group; R2 and R3 are hydrogen or any non-metallic group, and R2 and R3 can be joined to form a ring that may be aromatic, aliphatic or heterocyclic and may be further substituted; or a colorant of Formula 2:

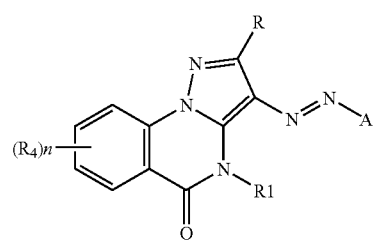

wherein R4 is hydrogen or any non-metallic group; n is an integer of 0-4; and, if n is 2-4, the R4 groups may be the same or different from each other, and a printing method for creating an image on an ink compatible substrate using colorants of Formula 1 or Formula 2.

21 Claims, No Drawings

INKJET INKS CONTAINING AZO PYRAZOLOBENZOPYRIMIDINEONE CLASS OF COLORANTS

FIELD OF THE INVENTION

The present invention relates to new colorants and their use in inks, particularly inkjet inks.

BACKGROUND OF THE INVENTION

Inkjet printing is a non-impact method for producing images by the deposition of ink droplets in a pixel-by-pixel manner to an image recording element in response to digital signals. There are various methods that may be utilized to control the deposition of ink droplets on the image recording element to yield the desired image. In one process, known as continuous inkjet, a continuous stream of droplets is charged and deflected in an imagewise manner onto the surface of the image recording element, while unimaged droplets are caught and returned to an ink sump. In another process, known as drop-on-demand inkjet, individual ink droplets are projected as needed onto the image recording element to form the desired image. Common methods of controlling the projection of ink droplets in drop-on-demand printing include piezoelectric transducers and thermal bubble formation. Inkjet printers have found broad applications across markets ranging from industrial labeling to short run printing to desktop document and pictorial imaging.

The inks used in the various inkjet printers can be classified as either dye-based or pigment-based. A dye is a colorant that is dissolved in the carrier medium, A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic solvents and high boiling organic solvents, such as hydrocarbons, esters, and ketones. Aqueous-based ink compositions are preferred because they are more environmentally friendly, as compared to solvent-based inks, plus most print heads are designed for use with aqueous-based inks.

Materials used in inkjet printing inks must have the correct properties to provide ink that is stable, possesses good printing properties, and provides an image with good color, sharpness and image stability. The ink composition may be colored with pigments, dyes, polymeric dyes, loaded-dye/latex particles, or any other types of colorants, or combinations thereof. The ink composition may be yellow, magenta, cyan, black, gray, red, violet, blue, green, orange, and brown for example.

Many dyes are known and used in inkjet printing inks. Many have some or most of these desirable properties but it is very difficult to find a dye which possesses all of the above attributes. Inkjet inks generally contain a dye that is soluble in an ink vehicle such as water or a mixture composed of water and a known water soluble or water miscible organic solvent. Typically the dyes are chosen from acid, direct and reactive dyestuffs. Water solubility of these dyes is due to the incorporation of negatively charged substituent groups such as sulfo or carboxy. Dyes are degraded by ozone and light and their stability with regard to these two agents can differ, depending on media and ink composition. There is a great need to develop dye-based inks that have high optical densities on receivers and also superior lightfastness and colorfastness, when printed on different types of media, in particular, fast drying or porous media, as well as plain paper.

The dyes currently in commercial aqueous ink formulations are less than optimal in one property or another. They are used because they achieve an acceptable, but not superior, balance of features. Some examples of such dyes are Direct Yellow 132 (CAS 10114-86-0) and Direct Yellow 86 (CAS 50295-42-3), Acid Yellow 23 (CAS 1934-21-0) and Acid Yellow 17 (CAS 6359-98-4) which have good hue and ozone fastness, but poor light stability. U.S. Pat. Nos. 6,468,338 and 6,464,767, incorporated herein by reference, disclose water-soluble azoindole dyes for use in inkjet printing including dyes derived from diazotizable heteroaromatic amines. Dyes suitable for use in inkjet inks include, but are not limited to, those commonly used in the art of inkjet printing.

For aqueous-based ink compositions, such dyes include water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes and the like. Some other water soluble dyes include Acid Red 52; azo-naphthol dyes such as Acid Red 249, Direct Red 227 or Reactive Red 31; azo-aniline dyes; azo-thiazole dyes; arylazonaphthylamine dyes such as Direct Red 75 or Ilford M-377; metal-complex azo dyes such as Reactive Red 23, CAS Registry No. 347417-99-6 or any of the dyes described in U.S. Pat. No. 6,001,161, incorporated herein by reference, and anthrapyridone dyes, such as Acid Red 80 and 82. JP 3241858B2, incorporated herein by reference, describes dyes related to the dyes of this invention for use in thermal transfer systems, but does not describe water soluble analogues or analogues bearing groups specifically for the purpose of reducing solubility to make the dyes behave like pigments.

To be useful in a thermal transfer system, it is necessary to design dyes with properties suited for that application. JP 2005082670, incorporated herein by reference, describes heterocyclic azo dyes generically derived from a pyrazole-based coupler precursor, however the dyes of this invention are tailored for use, specifically, with a particular polymeric component and do not function as useful colorants in the absence of such a component. The dyes of that invention are based specifically on 5-5 bicyclic couplers and are ballasted to improve interaction with the polymeric component. The dyes of the present invention are useful as colorants alone in an aqueous ink system, in either dissolved or particulate form. The dyes are specifically derived from a 5-6 bicyclic coupler precursor.

While glossy, porous media have the ability to absorb high concentrations of ink instantly, they suffer from image fastness problems, such as fading due to exposure to radiation by daylight, tungsten light, fluorescent light, or ozone, as described by D. E. Bugner and C. Suminski, "Filtration and Reciprocity Effects on the Fade Rate of Inkjet Photographic Prints", Proceedings of IS&T's NIP16: International Conference on Digital Printing Technologies, Vancouver, BC, October 2000. It is believed that the poor image fastness may be attributed to the greater permeability of the porous image receiving layers (IRLs) to oxygen and/or other airborne reactants such as ozone. Porous media is important because such fast drying media is becoming more and more popular and while most dyes are stable on gel-based or swellable media, porous media are more stringent in their demand for a high level of stability. It is also important for colorants to perform well on all grades of plain paper. Plain paper is used by most consumers in home inkjet printers.

Pigments are used in inkjet printing in an effort to solve some of the problems present with dye-based inks. Pigments generally have better stability to light and ozone than dyes. The physical properties of the pigment present a new group of challenges. The pigment particles must be very small in order to give good transparency and high density when printed. This is often achieved by grinding or milling the pigment in the presence of a suitable dispersant. The pigment must have very low solubility in the ink formulation and must not be prone to clumping or particle growth, or poor jetting behavior will result. It is often hard to tailor the hue of a pigment to that which is desired, because the physical properties of the intermolecular array, formed by the interaction of the individual pigment molecules with each other, often overwhelm the electronic effect of the substituents on the individual molecules. Hue is also affected by crystal morphology and particle size distribution. It is often hard to control these features without extensive trial and error experimentation with each pigment to find the preparation conditions and/or the post treatment that imparts the desired property.

A wide variety of organic and inorganic pigments, alone or in combination with additional pigments or dyes, may be used in the ink composition of the present invention. Pigments that may be used in the invention include those disclosed in, for example, U.S. Pat. Nos. 5,026,427; 5,086,698; 5,141,556; 5,160,370; and 5,169,436, all incorporated herein by reference. The exact choice of pigments will depend upon the specific application and performance requirements such as color reproduction and image stability.

Pigments suitable for use in inkjet inks include, but are not limited to, azo pigments, monoazo pigments, diazo pigments, azo pigment lakes, β-Naphthol pigments, Naphthol AS pigments, benzimidazolone pigments, diazo condensation pigments, metal complex pigments, isoindolinone and isoindoline pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Although many classes of pigments are known, the producers of inkjet inks tend to limit their pigment choices to a relatively small subset of pigments that are commercially available at high purity and that behave well in the ink formulation.

PROBLEM TO BE SOLVED

There remains a need to identify and select those colorants that are useful in producing a high quality image with desired hue and good stability, and that can be formulated into an ink that performs well in the inkjet printing method of choice. Invention and demonstrated utility in inks of new classes of dyes and pigments provides the ink maker with more choices in terms of hue, compatibility with the other elements in the ink formulation and ink ejection device, and increases the probability that a colorant with properties closely matched to the performance requirements of a particular application will be found. There also remains a need for dyes that are not degraded by ozone and light. There is a great need to develop dye-based inks that have high optical densities on receivers and also superior lightfastness and colorfastness, when printed on different types of media, in particular, fast drying or porous media, as well as plain paper.

SUMMARY OF THE INVENTION

The present invention relates to an aqueous ink comprising at least water, and a colorant of Formula 1

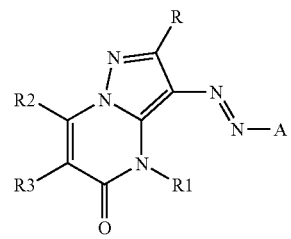

wherein:

A is any substituted or unsubstituted aromatic or heteroaromatic moiety;

R is hydrogen or any non-metallic group;

R1 is hydrogen, or any substituted or unsubstituted aryl, alkenyl, alkynyl or alkyl group;

R2 and R3 are hydrogen or any non-metallic group, and

R2 and R3 are capable of being joined to form a ring that may be aromatic, aliphatic or heterocyclic and may be further substituted.

The present invention also relates to an aqueous ink comprising at least water and a colorant of Formula 2

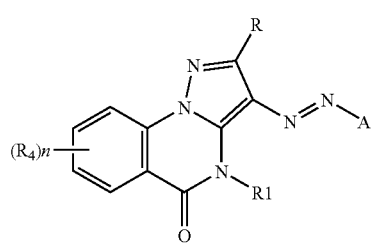

wherein:

A is any substituted or unsubstituted aromatic or heteroaromatic moiety;

R is hydrogen or any non-metallic group;

R1 is hydrogen, or any substituted or unsubstituted aryl, alkenyl, alkynyl or alkyl group;

R4 is hydrogen or any non-metallic group;

n is an integer of 0-4; and, if n is 2-4, the R4 groups may be the same or different from each other.

Finally, the present invention relates to a printing method for creating an image on an ink compatible substrate comprising:

a. providing an apparatus with multiple addressable nozzles capable of ejecting ink droplets with three or more inks simultaneously;

b. loading said apparatus with an ink recording element comprising a support having thereon an image receiving layer;

c. loading said apparatus with a set of at least three inks of different colors to be printed by said apparatus wherein at least one of the inks contains a colorant of Formula 1 or Formula 2:

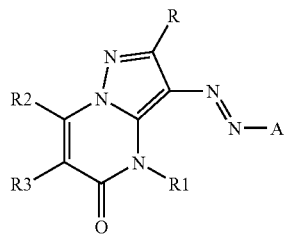

wherein:

A is any substituted or unsubstituted aromatic or heteroaromatic moiety;

R is hydrogen or any non-metallic group;

R1 is hydrogen, or any substituted or unsubstituted aryl, alkenyl, alkynyl or alkyl group;

R2 and R3 are independently hydrogen or any non-metallic group and R2 and R3 are capable of being joined to form an aromatic, aliphatic or heterocyclic ring and may be further substituted; and

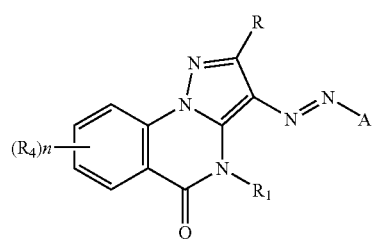

R4 is hydrogen or any non-metallic group;

n is an integer of 0-4; and, if n is 2-4, the R4 groups may be the same or different from each other

ADVANTAGEOUS EFFECT OF THE INVENTION

The present invention includes several advantages, not all of which are incorporated in a single embodiment. The new classes of dyes and pigments demonstrate utility in inks and provide the ink maker with more choices in terms of hue, compatibility with the other elements in the ink formulation and ink ejection device, and increases the probability that a colorant with properties closely matched to the performance requirements of a particular application will be found. The inventive colorants provide ozone fastness and light stability.

DETAILED DESCRIPTION OF THE INVENTION

This invention provides an ink composition comprising a colorant represented by Formula 1:

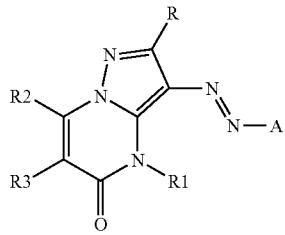

wherein A may be any substituted or unsubstituted aromatic or heteroaromatic moiety; R may be hydrogen or any non-metallic group, some examples of which are substituted or unsubstituted aryl, alkenyl, alkynyl or any alkyl group, a carboxyl, acyl, alkoxy, nitro, cyano, thio, fluoro, chloro, bromo, iodo, trifluoromethyl, sulfo, amino, amido, carbonate, ureido, or heterocyclic group; R1 may be hydrogen, or any substituted or unsubstituted aryl, alkenyl, alkynyl or alkyl group; R2 and R3 may be hydrogen or any non-metallic group, some examples of which are substituted or unsubstituted aryl, alkenyl, alkynyl or any alkyl group, a carboxyl, acyl, alkoxy, nitro, cyano, thio, fluoro, chloro, bromo, iodo, trifluoromethyl, sulfo, hydroxy, amino, amido, carbonate, urido, or heterocyclic group, and in addition, R2 and R3 may be joined to form a ring that may be aromatic, aliphatic or heterocyclic and may be further substituted.

The colorant molecule may bear ionizable groups capable of imparting water solubility and the ionizable groups may be in their protonated form or they may be ionized and associated with an appropriate counter ion. Some examples include lithium, sodium, potassium, ammonium, and trialkylammonium.

The colorant molecule may be soluble in the medium of the ink or it may be insoluble under the conditions of use. If the colorant is insoluble under the conditions of use, it must be sufficiently insoluble so it may be present as a microparticulate suspension that is stable enough to be jetted through the ink ejection mechanism. For the purpose of discussion, the colorants that are insoluble in the working formulation may be referred to as pigments and the soluble ones may be referred to as dyes.

In another embodiment of the invention, the colorant may be represented by Formula 2,

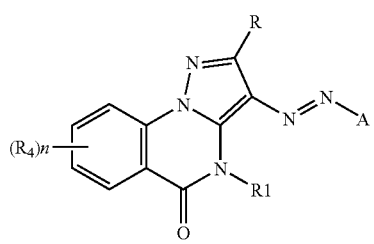

wherein A, R, and R1 are described as above; R4 may be hydrogen or any non-metallic group, some examples of which are substituted or unsubstituted aryl, alkenyl, alkynyl or any alkyl group, a carboxyl, acyl, alkoxy, nitro, cyano, thio, fluoro, chloro, bromo, iodo, trifluoromethyl, sulfo, hydroxy, amino, amido, carbonate, ureido, or heterocyclic group, and n may be an integer of from 0-4 and the R4 groups may be the same or different from each other. The compound of Formula 2 desirably contains at least one ionizable group and is soluble in water at a level of 0.5% by weight or more. When the ink comprises a colorant of Formula 2, a dispersant at a level of 10-70% of the weight of the colorant is useful. It is desirable for the compound to contain at least one ionizable group selected from the group consisting of a sulfonic acid, a carboxylic acid, a sulfuric acid half ester, a sulfonic acid, or a combination thereof.

In yet another embodiment of the invention, the colorant may be a compound of Formula 2, where A may be a heterocyclic group chosen from the groups shown in Table 1, with the point of attachment of the azo group designated by:

TABLE 1

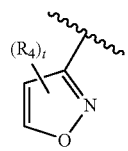

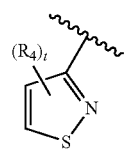

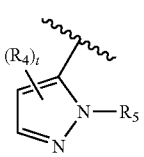

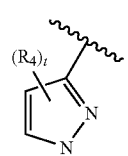

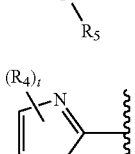

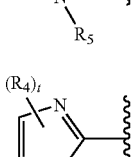

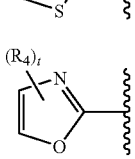

TABLE 1-continued

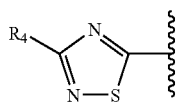

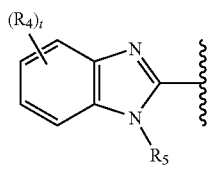

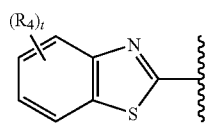

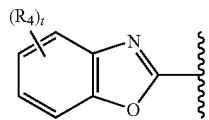

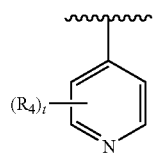

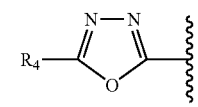

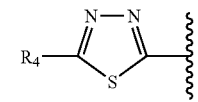

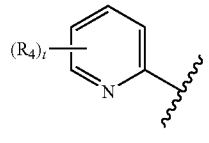

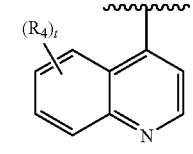

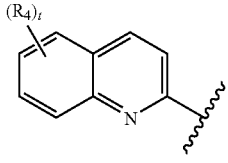

TABLE 1-continued

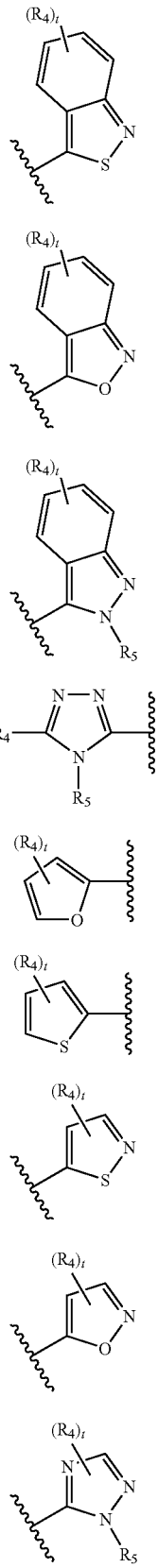

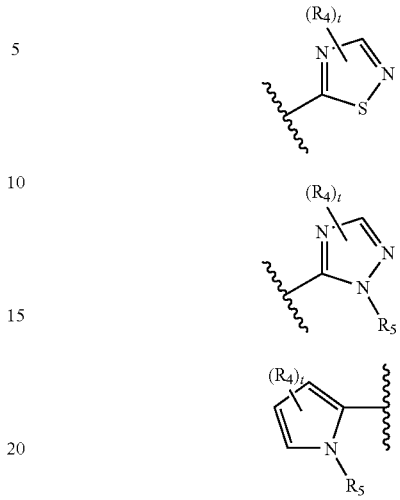

where $R_4$ has the same meaning as above and t may be an integer of from 0-4. $R_5$ has the same meaning as $R_1$, above.

Unless otherwise specifically stated, use of the term "substituted" or "substituent" means any group or atom other than hydrogen. Additionally, unless specifically stated otherwise, whenever a substituent comprises a substitutable hydrogen, it is intended that the substituent encompasses not only the substituent's unsubstituted form, but also its form further substituted with any substituent group or groups as herein mentioned, so long as the substituent group does not destroy properties necessary inkjet utility.

Suitably, a substituent group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight or branched chain or cyclic alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butylamido, tetradecanamido, alpha-(2,4-di-t-pentyl-phenoxy)acetamido, alpha-(2,4-di-t-pentylphenoxy)butylamido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecylphenylcarbonylamino, p-tolylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfanoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1-(N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituent groups may themselves be further substituted one or more times with the described substituent groups. The particular substituents used may be selected by those skilled in the art to attain the desired dye properties for a specific application and can include, for example, hydrophobic groups, solubilizing groups, blocking groups, and releasing or releasable groups. When a molecule may have two or more substituents, the substituents may be joined together to form a ring such as a fused ring unless otherwise provided. Generally, the above groups and substituents thereof may include those having up to 48 carbon atoms, typically 1 to 36 carbon atoms and usually less than 24 carbon atoms, but greater numbers are possible depending on the particular substituents selected.

To use the colorants of the invention, they must have either adequate water solubility to enable preparation of an ink containing between 0.1 and 10% dissolved dye which does not form crystals or precipitate upon storage, or the colorant must have sufficient insolubility to form microparticulate dispersions that can be formulated into ink containing between about 0.1-10% pigment and be jetted through the inkjet printhead without problems. For both dye and pigment inks, the preferred range of colorant in the ink is about 2-8%. The ink should contain sufficient colorant to give good density when printed. The dyes may be present in protonated or ionized form and if ionized, they may be associated with a suitable counter ion. Examples of suitable counterions include lithium, sodium, potassium, ammonium, or tetraalkyl ammonium.

The ink of the invention may be utilized in any ink printing process. Although preferred for inkjet use, it also could be used for any printing or writing process using ink. Typical of such processes are pen plotters and pens.

Examples of the dyes of the invention include, but are not limited to those in Table 2. The dyes bearing ionizable groups are shown in the acid form but may be present as a salt with an appropriate counter ion.

TABLE 2

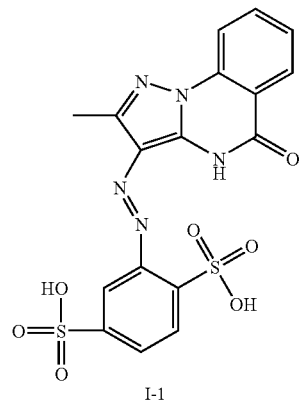

I-1

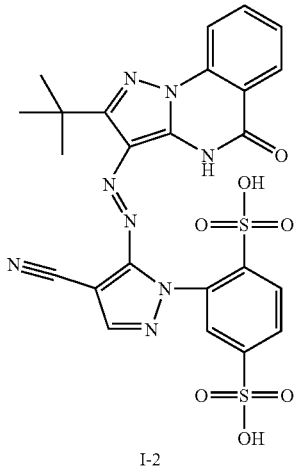

I-2

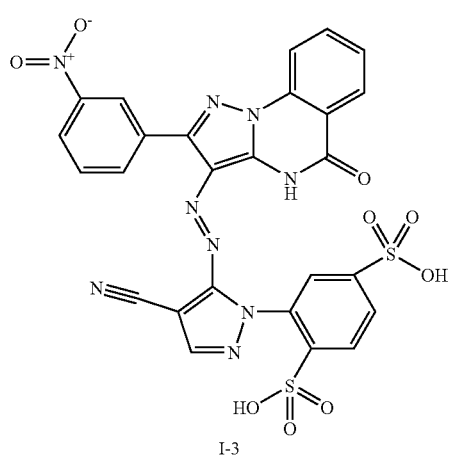

I-3

TABLE 2-continued
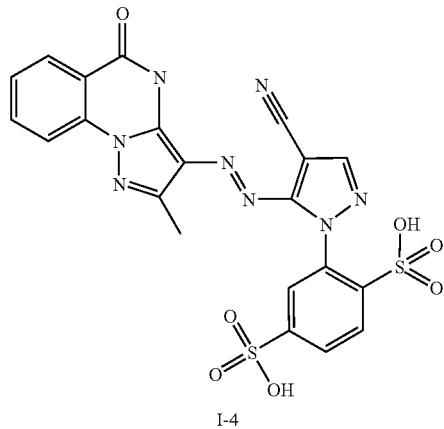
I-4
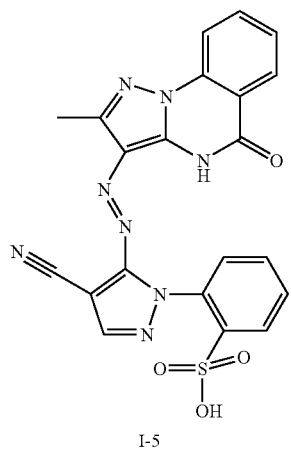
I-5
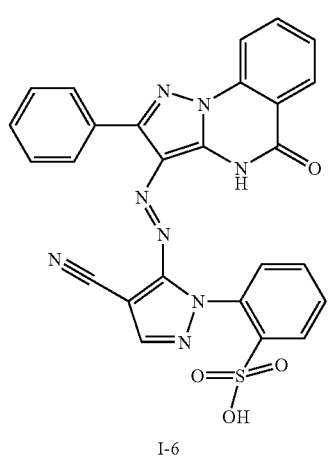
I-6
TABLE 2-continued
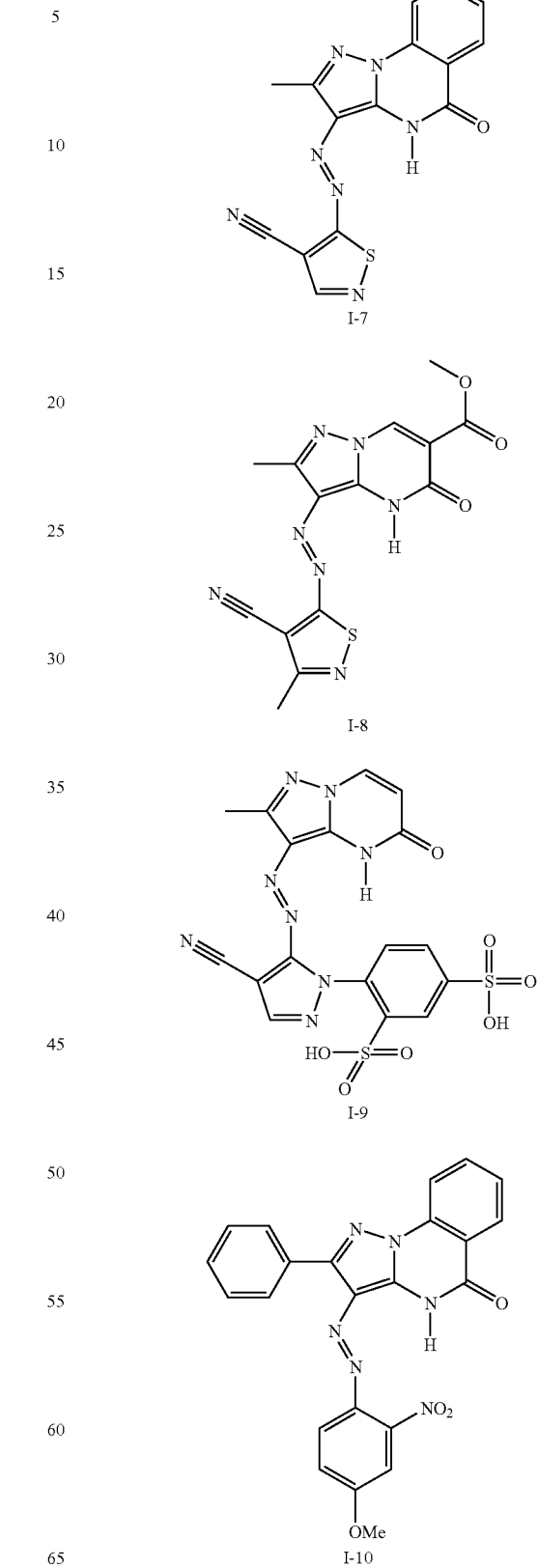
I-7
I-8
I-9
I-10

TABLE 2-continued
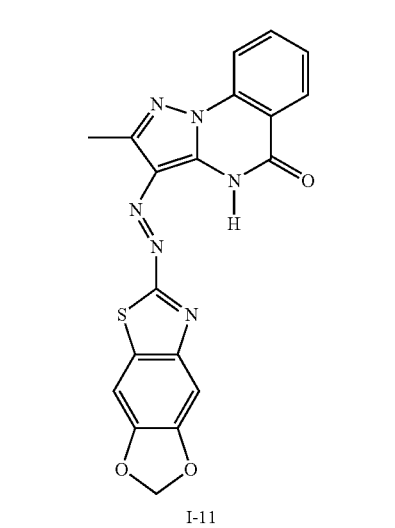
I-11
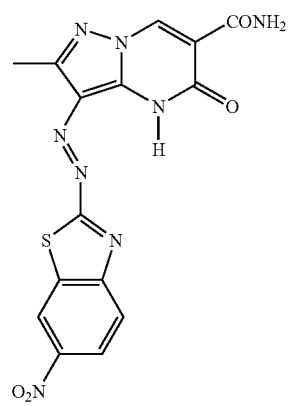
I-12
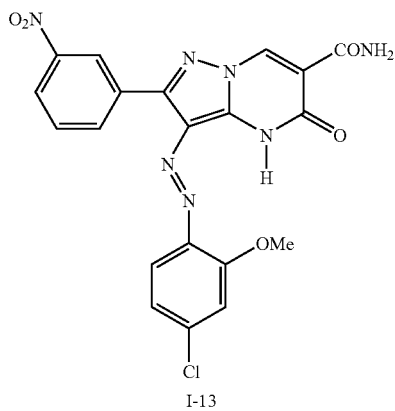
I-13
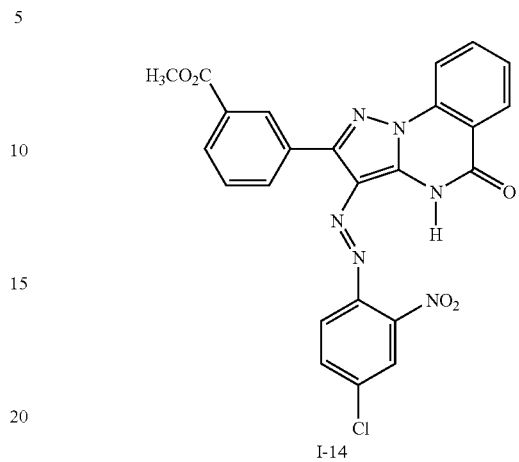
I-14
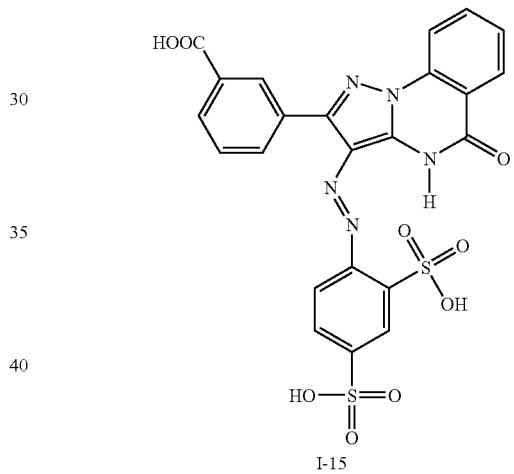
I-15
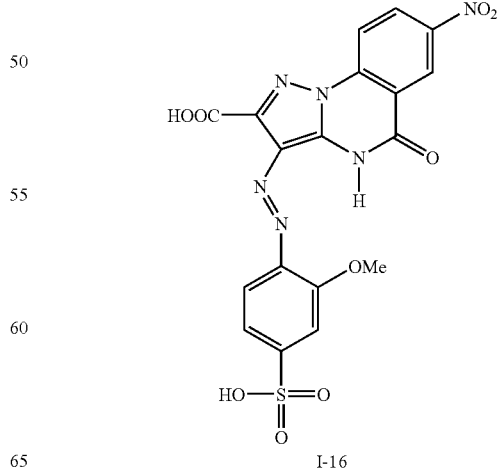
I-16

TABLE 2-continued
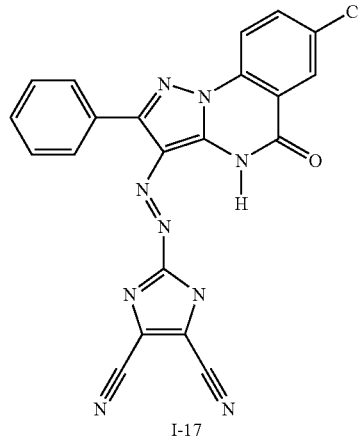
I-17
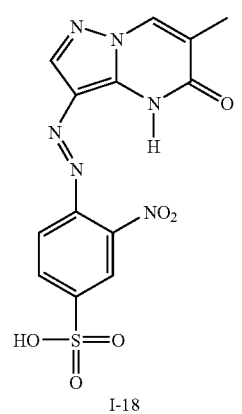
I-18
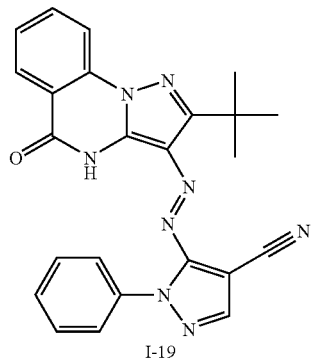
I-19
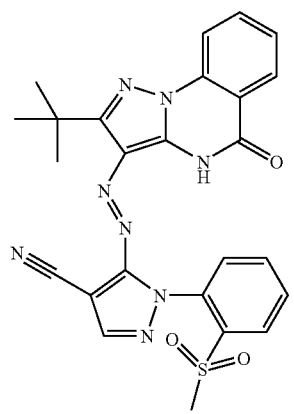
TABLE 2-continued
I-20
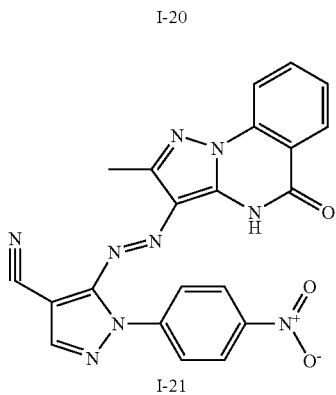
I-21
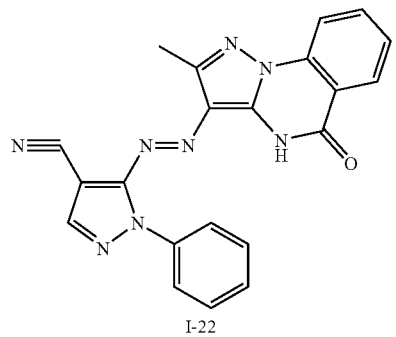
I-22
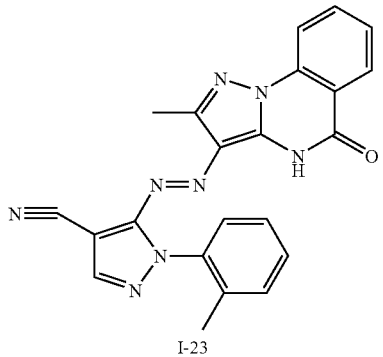
I-23
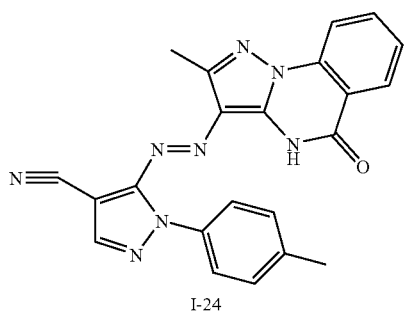
I-24

TABLE 2-continued

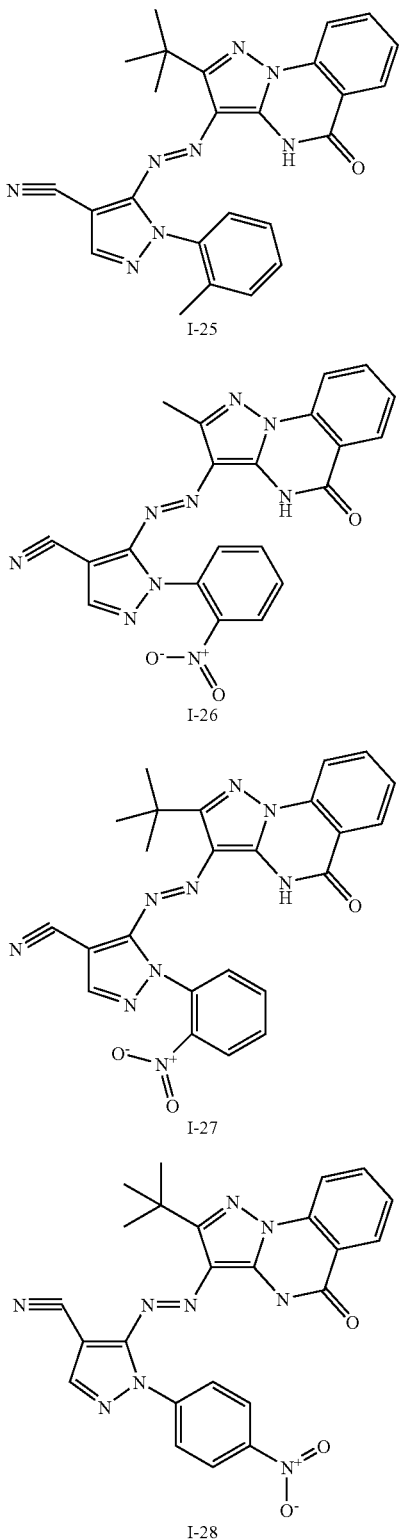

I-25

I-26

I-27

I-28

Full color inkjet printing normally employs a set of at least three primary inks—cyan, magenta and yellow. In addition, black, orange, red, blue and green inks and lower strength formulations of the primary inks may be used to provide improved image quality. Inks containing the colorants of this invention may be used in combination with inks containing other dyes and pigments useful for inkjet printing.

Pigment-based ink compositions useful in the invention may be prepared by any method known in the art of inkjet printing. Useful methods commonly involve two steps: (a) a dispersing or milling step to break up the pigments to primary particles, where primary particle is defined as the smallest identifiable subdivision in a particulate system, and (b) a dilution step in which the pigment dispersion from step (a) is diluted with the remaining ink components to give a working strength ink.

The milling step (a) is carried out using any type of grinding mill, such as a media mill, a ball mill, a two-roll mill, a three-roll mill, a bead mill, an air-jet mill, an attritor, or a liquid interaction chamber. In the milling step (a), pigments are optionally suspended in a medium which is typically the same as or similar to the medium used to dilute the pigment dispersion in step (b). Inert milling media are optionally present in the milling step (a) in order to facilitate break up of the pigments to primary particles. Inert milling media include such materials as polymeric beads, glasses, ceramics, metals and plastics as described, for example, in U.S. Pat. No. 5,891,231, incorporated herein by reference. Milling media are removed from either the pigment dispersion obtained in step (a) or from the ink composition obtained in step (b).

A dispersant is optionally present in the milling step (a) in order to facilitate break up of the pigments into primary particles. For the pigment dispersion obtained in step (a) or the ink composition obtained in step (b), a dispersant is optionally present in order to maintain particle stability and prevent settling. Dispersants suitable for use in the invention include, but are not limited to, those commonly used in the art of inkjet printing. For aqueous pigment-based ink compositions, useful dispersants include anionic, cationic or nonionic surfactants such as sodium dodecylsulfate, or potassium or sodium oleylmethyltaurate as described in U.S. Pat. Nos. 5,679,138; 5,651,813 or 5,985,017, all incorporated herein by reference.

Polymeric dispersants are also known and useful in aqueous pigment-based ink compositions. Polymeric dispersants may be added to the pigment dispersion prior to, or during the milling step (a), and include polymers such as homopolymers and copolymers; anionic, cationic or nonionic polymers; or random, block, branched or graft polymers. Polymeric dispersants useful in the milling operation include random and block copolymers having hydrophilic and hydrophobic portions, as described in U.S. Pat. Nos. 4,597,794; 5,085,698; 5,519,085; 5,272,201; 5,172,133; or 6,043,297; and graft copolymers, as described in U.S. Pat. Nos. 5,231,131; 6,087,416; 5,719,204; or 5,714,538, all incorporated herein by reference.

Composite colorant particles having a colorant phase and a polymer phase are also useful in aqueous pigment-based inks of the invention. Composite colorant particles are formed by polymerizing monomers in the presence of pigments, as described in U.S. patent application Ser. Nos. 10/446,013; 10/446,059; or 10/665,960, all incorporated herein by reference. Microencapsulated-type pigment particles are also useful and consist of pigment particles coated with a resin film, as described in U.S. Pat. No. 6,074,467, incorporated herein by reference.

Aqueous pigment-based ink compositions of the invention may also contain self-dispersed colorants in which the surfaces of pigment particles are chemically functionalized such that a separate dispersant is not necessary, as described in U.S. Pat. Nos. 6,494,943 B1 and 5,837,045, both incorporated herein by reference. Also useful in the invention are polymeric dyes or loaded-dye/latex particles. Examples of polymeric dyes are described in U.S. Pat. No. 6,457,822 B1 and references therein, incorporated herein by reference. Examples of loaded-dye/latex particles are described in U.S. Pat. No. 6,431,700 B1 and U.S. application Ser. Nos. 10/393, 235; 10/393,061; 10/264,740; 10/020,694; and 10/017,729, all incorporated herein by reference.

Inkjet ink compositions may also contain non-colored particles such as inorganic particles or polymeric particles. The use of such particulate addenda has increased over the past several years, especially in inkjet ink compositions intended for photographic-quality imaging. For example, U.S. Pat. No. 5,925,178, incorporated herein by reference, describes the use of inorganic particles in pigment-based inks in order to improve optical density and rub resistance of the pigment particles on the image recording element. In another example, U.S. Pat. No. 6,508,548 B2, incorporated herein by reference, describes the use of a water-dispersible polymeric latex in dye-based inks in order to improve light and ozone resistance of the printed images. The polymeric particles are often referred to as binders in the art of inkjet ink compositions.

The ink composition may contain non-colored particles such as inorganic or polymeric particles in order to improve gloss differential, light and/or ozone resistance, waterfastness, rub resistance and various other properties of a printed image, as described in U.S. Pat. Nos. 6,598,967 B1 or 6,508,548 B2, both incorporated herein by reference. Colorless ink compositions that contain non-colored particles and no colorant may also be used. Colorless ink compositions are often used in the art as "fixers" or insolubilizing fluids that are printed under, over, or with colored ink compositions in order to reduce bleed between colors and waterfastness on plain paper, as described in U.S. Pat. No. 5,866,638 or 6,450,632 B1, both incorporated herein by reference. Colorless inks are also used to provide an overcoat to a printed image, usually in order to improve scratch resistance and waterfastness, as described in U.S. Pat. Appl. Ser. No. 2003/0009547 A1 or E.P. 1,022,151 A1, both incorporated herein by reference. Colorless inks are also used to reduce gloss differential in a printed image, as described in U.S. Pat. Nos. 6,604,819 B2; 2003/0085974 A1; 2003/0193553 A1; or 2003/0189626 A1, all incorporated herein by reference.

Examples of inorganic particles useful in the invention include, but are not limited to, alumina, boehmite, clay, calcium carbonate, titanium dioxide, calcined clay, aluminosilicates, silica, or barium sulfate.

For aqueous-based inks, polymeric particles useful in the invention include water-dispersible polymers generally classified as either addition polymers or condensation polymers, both of which are well-known to those skilled in the art of polymer chemistry. Examples of polymer classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric, film-forming, non-film-forming, fusible, or heavily cross-linked and can have a wide range of molecular weights and glass transition temperatures.

Examples of useful polymeric particles are styrene-acrylic copolymers sold under the trade names Joncryl® (BASF), Ucar™ (Dow Chemical Co.), Jonrez® (MeadWestvaco Corp.), and Vancryl® (Air Products and Chemicals, Inc.); sulfonated polyesters sold under the trade name Eastman AQ® (Eastman Chemical Co.); polyethylene or polypropylene resin emulsions and polyurethanes, such as the Witcobonds® from Witco. These polymeric particles are preferred because they are compatible in typical aqueous-based ink compositions, and because they render printed images that are highly durable towards physical abrasion, light and ozone.

The non-colored particles used in the ink composition of the invention may be present in any effective amount, generally from 0.01 to 20% by weight, and preferably from 0.01 to 6% by weight. The exact choice of non-colored particles will depend upon the specific application and performance requirements of the printed image.

Ink compositions may also contain water-soluble polymers often referred to as resins or binders in the art of inkjet ink compositions. The water-soluble polymers useful in the ink composition are differentiated from polymer particles in that they are soluble in the water phase or combined water/water-soluble solvent phase of the ink. Included in this class of polymers are nonionic, anionic, amphoteric and cationic polymers. Representative examples of water soluble polymers include polyvinyl alcohols, polyvinyl acetates, polyvinyl pyrrolidones, carboxy methyl cellulose, polyethyloxazolines, polyethyleneimines, polyamides and alkali soluble resins; polyurethanes, such as those found in U.S. Pat. No. 6,268,101, incorporated herein by reference; polyacrylic acids, styrene-acrylic methacrylic acid copolymers, such as Joncryl® 70 from BASF, TruDot™ IJ-4655 from MeadWestvaco Corp., and Vancryl® 68S from Air Products and Chemicals, Inc.

Ink compositions useful in the invention include humectants and/or co-solvents in order to prevent the ink composition from drying out or crusting in the nozzles of the printhead, aid solubility of the components in the ink composition, or facilitate penetration of the ink composition into the image recording element after printing. Representative examples of humectants and co-solvents used in aqueous-based ink compositions include (1) alcohols, such as methyl alcohol ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, triethylene glycol, tetraethylene glycol, propylene glycol, polyethylene glycol, polypropylene glycol, 1,2-propane diol, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol, glycerol, 1,2,6-hexanetriol, 2-ethyl-2-hydroxymethyl-propane diol, saccharides and sugar alcohols and thioglycol; (3) lower mono- and di-alkyl ethers derived from the polyhydric alcohols, such as ethylene glycol monomethyl ether, ethylene glycol monobutyl ether, ethylene glycol monoethyl ether acetate, diethylene glycol monomethyl ether, and diethylene glycol monobutyl ether acetate (4) nitrogen-containing compounds, such as urea, 2-pyrrolidone, N-methyl-2-pyrrolidone, and 1,3-dimethyl-2-imidazolidinone; and (5) sulfur-containing compounds, such as 2,2'-thiodiethanol, dimethyl sulfoxide and tetramethylene sulfone. Typical aqueous-based ink compositions useful in the invention may contain, for example, the following components based on the total weight of the ink: water 20-95%, humectant(s) 5-70%, and co-solvent(s) 2-20%.

Surfactants may be added to adjust the surface tension of the ink to an appropriate level. The surfactants may be anionic, cationic, amphoteric or nonionic and used at levels of 0.01 to 5% of the ink composition. Examples of suitable nonionic surfactants include linear or secondary alcohol ethoxylates, such as the Tergitol® 15-S and Tergitol® TMN series available from Union Carbide and the Brij® series from Uniquema, ethoxylated alkyl phenols, such as the Triton® series from Union Carbide, fluoro surfactants, such as the Zonyls® from DuPont, and the Fluorads® from 3M, fatty acid ethoxylates, fatty amide ethoxylates, ethoxylated and propoxylated block copolymers, such as the Pluronic® and Tetronic® series from BASF, ethoxylated and propoxylated silicone based surfactants, such as the Silwet® series from CK Witco, alkyl polyglycosides, such as the Glucopons® from Cognis, and acetylenic polyethylene oxide surfactants, such as the Surfynols from Air Products.

Examples of anionic surfactants include carboxylated, such as ether carboxylates and sulfosuccinates, sulfated, such as sodium dodecyl sulfate, sulfonated, such as dodecyl benzene sulfonate, alpha olefin sulfonates, alkyl diphenyl oxide disulfonates, fatty acid taurates and alkyl naphthalene sulfonates, phosphated, such as phosphated esters of alkyl and aryl alcohols, including the Strodex® series from Dexter Chemical, phosphonated and amine oxide surfactants and anionic fluorinated surfactants. Examples of amphoteric surfactants include betaines, sultaines, and aminopropionates. Examples of cationic surfactants include quaternary ammonium compounds, cationic amine oxides, ethoxylated fatty amines and imidazoline surfactants. Additional examples are of the above surfactants are described in "McCutcheon's Emulsifiers and Detergents: 1995, North American Editor".

A biocide may be added to an inkjet ink composition to suppress the growth of micro-organisms, such as molds and fungi, in aqueous inks. A preferred biocide for an ink composition is Proxel® GXL (Zeneca Specialties Co.) at a final concentration of 0.0001-0.5 wt. %.

Additional additives which may optionally be present in an inkjet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers and defoamers.

The pH of the aqueous ink compositions of the invention may be adjusted by the addition of organic or inorganic acids or bases. Useful inks may have a preferred pH of from about 2 to 10, depending upon the type of dye or pigment being used. Typical inorganic acids include hydrochloric, phosphoric sulfuric acids. Typical organic acids include methanesulfonic, acetic and lactic acids. Typical inorganic bases include alkali metal hydroxides and carbonates. Typical organic bases include ammonia, triethanolamine and tetramethylethylenediamine.

The exact choice of ink components will depend upon the specific application and performance requirements of the printhead from which they are jetted. Thermal and piezoelectric drop-on-demand printheads and continuous printheads each require ink compositions with a different set of physical properties in order to achieve reliable and accurate jetting of the ink, as is well known in the art of inkjet printing. Acceptable viscosities are no greater than 20 cP, and preferably in the range of about 1.0 to 6.0 cP. Acceptable surface tensions are no greater than 60 dynes/cm, and preferably in the range of 28 dynes/cm to 45 dynes/cm.

The inkjet inks provided by this invention may be employed in inkjet printing wherein liquid ink drops are applied in a controlled fashion to an ink receptive layer substrate, by ejecting ink droplets from a plurality of nozzles or orifices of the print head of an inkjet printer. The inks are suitable for use with any of the common inkjet heads for ejecting ink droplets in either drop-on-demand or continuous modalities.

The inks of the invention may be used with any inkjet receiver substrate. Ink receptive substrates useful in inkjet printing are well known to those skilled in the art. Representative examples of such substrates are disclosed in U.S. Pat. Nos. 5,605,750; 5,723,211; and 5,789,070 and EP 813 978 A1, all incorporated herein by reference. The inks may be used with plain paper as well as other receivers.

An inkjet recording element typically comprises a support having on at least one surface thereof an ink receiving or image receiving layer, and includes those intended for reflection viewing, which have an opaque support, and those intended for viewing by transmitted light, which have a transparent support.

In addition to plain paper, there are generally two types of ink-receiving layers (IRLs). The first type of image receiving layer (IRL) comprises a non-porous coating of a polymer with a high capacity for swelling and absorbing ink by molecular diffusion. Cationic or anionic substances are added to the coating to serve as a dye fixing agent or mordant for the cationic or anionic dye. This coating is optically transparent and very smooth, leading to a high glossy "photo-grade" receiver. The second type of image receiving layer (IRL) comprises a porous coating of inorganic, polymeric, or organic-inorganic composite particles, a polymeric binder, and additives such as dye-fixing agents or mordants. These particles can vary in chemical composition, size, shape, and intra-particle porosity. In this case, the printing liquid is absorbed into the open pores of the image receiving layer (IRL) to obtain a print which is instantaneously dry to the touch.

Inks containing the dyes of this invention may be used in ink sets in combination with inks containing other dyes and pigments useful for inkjet printing. Dyes useful for inkjet printing are normally water soluble dyes of the Acid, Direct, Reactive or Basic Color Index classifications. Typically ink sets may comprise magenta and cyan inks along with the yellow ink, but may also include one or more black inks, lower strength (light) yellow, magenta and cyan inks and alternate color inks such as orange, red, blue, and green. Typical cyan dyes may be copper phthalocyanine derivatives such as Direct Blue 199 and 86; triarylmethane dyes such as Acid Blue 9; azo, metal-complex azo, metal-complex formazan or anthraquinone dyes. Typical magenta dyes may be xanthene dyes such as Acid Red 52; azo-naphthol dyes such as Acid Red 249, Direct Red 227 or Reactive Red 31; azo-aniline dyes; azo-thiazole dyes; arylazonaphthylamine dyes such as Direct Red 75 or Ilford M-377; metal-complex azo dyes such as Reactive Red 23, CAS Registry No. 347417-99-6 or any of the dyes described in U.S. Pat. No. 6,001,161; anthrapyridone dyes such as Acid Red 80 and 82; or anthraquinone dyes. Typical black dyes that are useful for inkjet printing include polyazo dyes such as Food Black 2, Direct Black 22 or Direct Black 19; metal-complex polyazo dyes such as Reactive Black 31, Pacified Reactive Black 31 or Ilford K-1334; sulfur black dyes or aniline black dyes.

Pigments suitable for use with colorants of the invention include, but are not limited to, azo pigments, monoazo pigments, disazo pigments, azo pigment lakes, β-Naphthol pigments, Naphthol AS pigments, benzimidazolone pigments, disazo condensation pigments, metal complex pigments, isoindolinone isoindoline pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Some specific examples of useful pigments are C.I. Pigment Blue 15:3, C.I. Pigment Red 122, C.I. Pigment Red 177, C.I. Pigment Red 202, C.I. Pigment Yellow 155, C.I. Pigment Yellow 74, C.I. Pigment Yellow 158, C.I. Pigment Violet 19, C.I. Pigment Violet 23, C.I. Pigment Black 7.

EXAMPLES

Preparation of Inventive Dyes

The coupler precursors to the dyes of the invention may be generally synthesized using the methods described in EP 0374781, incorporated herein by reference, Journal of Heterocyclic Chemistry, (1969) 6(6) 947, incorporated herein by reference, or the modification described below. Dyes of the invention are prepared according to the general method described in JP 3241858, incorporated herein by reference, or by the variation described below.

Preparation of Inventive Dye I-2

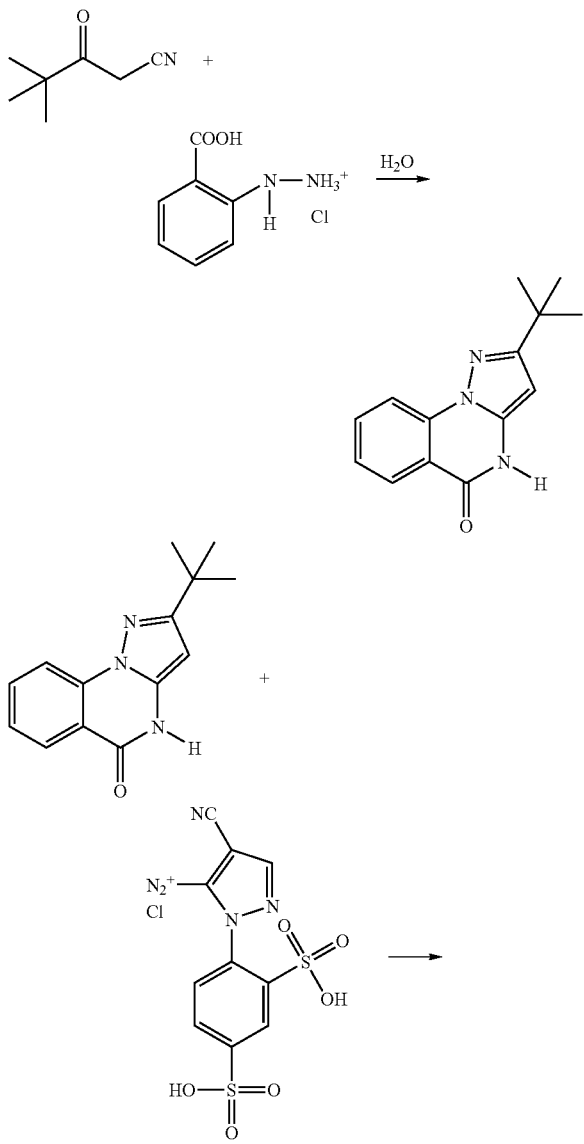

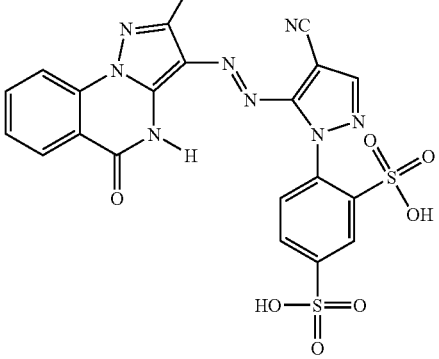

o-Hydrazinobenzoic acid hydrochloride (9.4 g, 0.05 mol) was suspended in 100 mL of water and to it was added 10 mL of conc. aqueous hydrochloric acid followed by pivaloyl acetonitrile (6.25 g, 0.05 mol). The mixture was stirred at room temperature under nitrogen for thirty minutes and then heated to reflux and held at reflux for two hours. The heat was turned off and the mixture was left to cool to room temperature overnight. A solid came out of solution and it was collected, washed with water and dried under vacuum at 40° C. overnight. The tan solid weighed 8.9 g (73.8% yield) and was pure enough for use in the next step. MS and NMR were consistent with the desired structure.

The requisite diazonium was prepared by addition of a slurry of 1.2 equivalents of the amine precursor in 10 parts (relative to the amine) 1:5 propionic acid: acetic acid to a stirred mixture of 1 part sulfuric acid, 1 part 1:5 acid and 1.1 equivalents (relative to amine) 40% wt/wt nitrosylsulfuric acid in sulfuric acid at 0° C. The resulting thick tan solution was stirred for two hours at 0-5° C.

The tricyclic coupler (1.8 g, 0.0075 mol) was mixed with 25 mL of THF and 25 mL of 1:5 propionic:acetic acid and cooled in ice/brine. With rapid stirring, the diazonium reaction mixture was poured in one stream. Temperature rose to 5° C. The orange reaction mixture was allowed to come to room temperature slowly. The reaction mixture was diluted with brine and the layers separated. The upper dye-containing layer was stripped to a solid. The solid was dissolved in saturated bicarbonate solution and then washed with ethyl acetate to remove neutral impurities. The bicarbonate solution containing the dye was subjected to preparative HPLC for purification to provide 3.3 gm (75% yield) of pure product, NMR and MS of which were consistent with the desired structure.

Preparation of Inks

Preparation of Inventive ink A Containing Soluble Dye I-4

An amount of 0.355 g of solid dye I-4 was weighed and dissolved in 5.0 grams of a solution of the following composition:
1,5-Pentanediol (15%),
1,2-hexanediol (3%),
2-pyrrolidinone (9%),
2-ethyl-2-(hydroxymethyl)-1,3-propanediol (9%),
Surfynol 465™ (0.5%),
Tergitol 15-S-5™ (0.6%), Proxel GXL (0.06%),
Kordek MLX™ (0.05%),
high purity water (62.79%).

To this mixture was added 4.64 grams of high purity water to make 10 grams of ink that is 3.55% dye by weight.

The ink was loaded into an empty ink cartridge and printed using a Canon S520 printer. The receiver was a porous glossy photo paper made by Konica. A target of four patches of pure yellow ink was printed at 25, 50, 75, and 100% of ink delivery. The blue density of each patch was recorded using a calibrated X-rite™ densitometer. The printed target was then exposed to various environmental conditions. The blue density of the patches after exposure was then recorded again and the amount of original density retained was calculated as the ratio of densities for the 100% ink patch.

Similarly, inks B and C were made for dyes I-1 and I-2. The concentration of dye in the ink for I-1 was 2.07% and for I-2 was 3.81%.

For comparison, a commercial dye (Direct Yellow 132) was also made into an ink of the same composition as the inventive dyes. The concentration of Direct Yellow 132 in the ink was 3.48%.

Direct Yellow 132

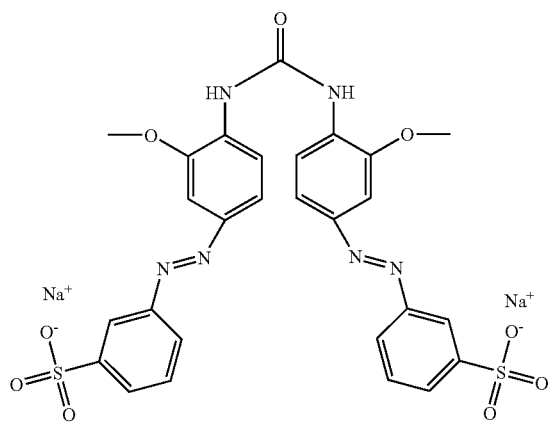

Preparation of Inventive Ink Containing Insoluble Dye I-5

Insoluble dye I-5, 1 g, Potassium Oleylmethyltaurine, 0.3 g, and water, 13.7 g, were placed in a 50 cc plastic centrifuge tube with 70g of 0.1 mm zirconia YTZ grinding media from Tosoh Corporation. A 0.5" diameter shaft with 0.25" long protruding knobs was inserted into the tube and stirred at 2300 rpm for 24 hrs. The resulting dispersion of yellow pigment was separated from the grinding media by filtration through a coarse sintered glass funnel.

To formulate the ink, 4.22 g of the pigment dispersion was added to 0.88 g of water and 5 g of a solution that was 14% glycerol, 10% ethylene glycol, 0.04% Kordek MLX™, 0.26% triethanolamine, 2.6% benzylmethacrylate, methacylic acid co-polymer (67/33 by weight), and 1% Strodex PK-90™.

Similar dispersions were made for insoluble dyes I-19, I-20, I-21, I-22, I-23, I-24, I-26, I-27, I-28. These dispersions were used to prepare a second set of inks by adding dispersion and water to a solution that was 20% glycerol, 4% ethylene glycol, 0.04% Kordek MLX™, 3% benzylmethacrylate, methacylic acid co-polymer (67/33 by weight), 3.2% polyurethane polymer, and 1.5% Tergitol 15-S-5™.

The inks were printed as above for the soluble dyes.

| Dye | Ink | Hue | λmax | Ozone high[1] | Ozone low[2] | 50 Kluz[3] |
|---|---|---|---|---|---|---|
| I-1 | B | Yellow | 374 | 95% | 93% | 88% |
| I-2 | C | Yellow | 417 | 97% | 96% | 99% |
| I-4 | A | Yellow | 387 | 85% | 94% | 65% |
| I-5 | D | Yellow | 433 | 99%[4] | Not tested | 66% |
| I-19 | E | Yellow | 445 | 99%[4] | Not tested | 81% |
| I-20 | F | Yellow | 450 | 99%[4] | Not tested | |
| I-21 | G | Yellow-orange | 440 | 100%[4] | Not tested | 28% |
| I-22 | H | Yellow | 430 | 96%[4] | Not tested | |
| I-23 | I | Yellow | 430 | 97%[4] | Not tested | |
| I-24 | J | Yellow | 425 | 95%[4] | Not tested | 49% |
| I-26 | K | Yellow | 430 | 97%[4] | Not tested | 25% |
| I-27 | L | Yellow | 445 | 95%[4] | Not tested | 97% |
| I-28 | M | Yellow-orange | 450 | 96%[4] | Not tested | 86% |
| C-1 DY132 | C-1 | Yellow | 425 | 81% | 76% | 31% |

[1]Test prints were placed in a darkened ozone chamber with a concentration of 5 ppm ozone for 24 hours.
[2]Test prints were placed in an environmentally controlled room under ambient light with a concentration of 60 ppb ozone for two weeks.
[3]Uncovered test strips were exposed to 50 Klux xenon arc lamp filtered to mimic D60 daylight for a period of 4 weeks.
[4]The insoluble dye was tested for a period of 1 week at 5 ppm ozone.

The data show that these materials are useful as colorants for inkjet inks with excellent stability toward ozone gas exposure and the potential of high light stability as well.

The invention has been described in detail with particular reference to certain preferred embodiments thereof but it will be understood that variations and modifications can be effected within the spirit and scope of the invention.

The invention claimed is:

1. An aqueous ink comprising at least water and a colorant of Formula 2

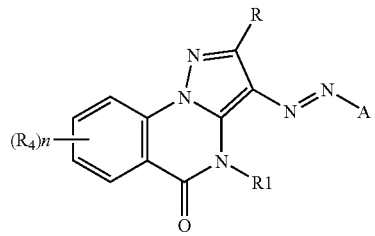

wherein:
A is any substituted or unsubstituted aromatic or heteroaromatic moiety;
R is hydrogen or any non-metallic group;
R1 is hydrogen, or any substituted or unsubstituted aryl, alkenyl, alkynyl or alkyl group;
$R_4$ is hydrogen or any non-metallic group;
n is an integer of 0-4;
and, if n is 2-4, the $R_4$ groups may be the same or different from each other.

2. The aqueous ink of claim 1 wherein the amount of colorant is at least 0.1% but not more than 10% by weight.

3. The aqueous ink of claim 1 wherein the compound of Formula 2 contains an A group selected from the group consisting of:

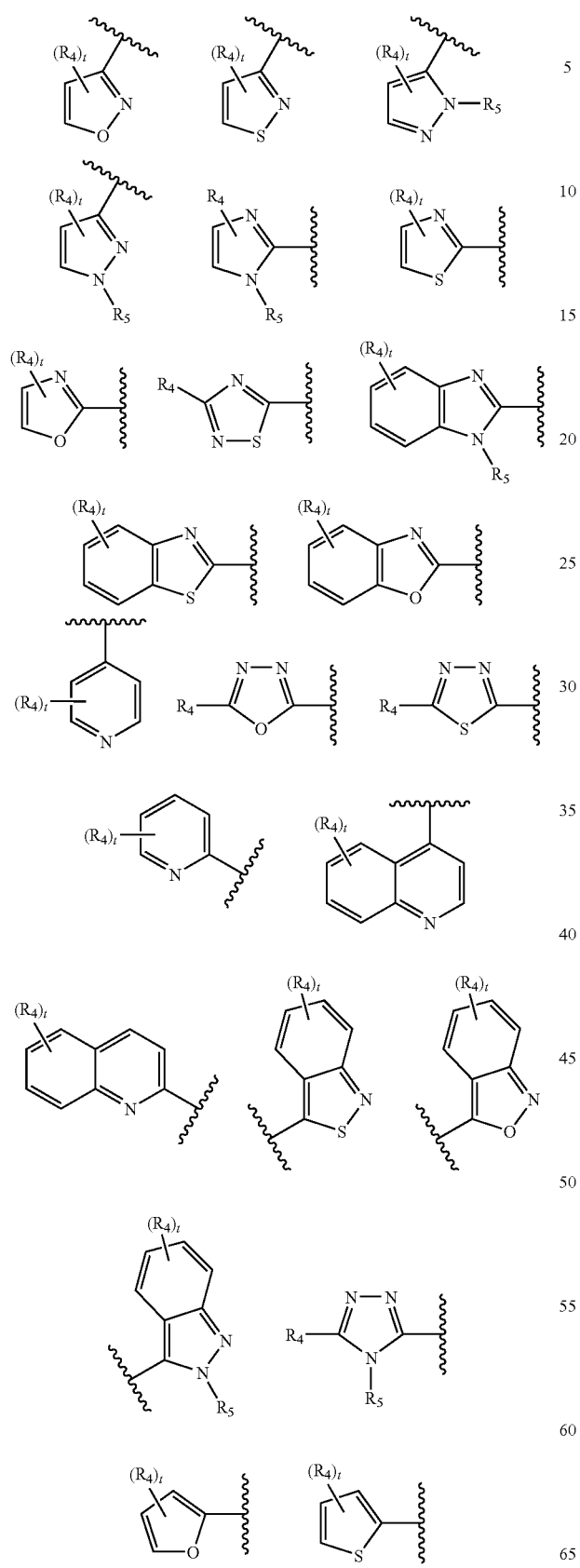

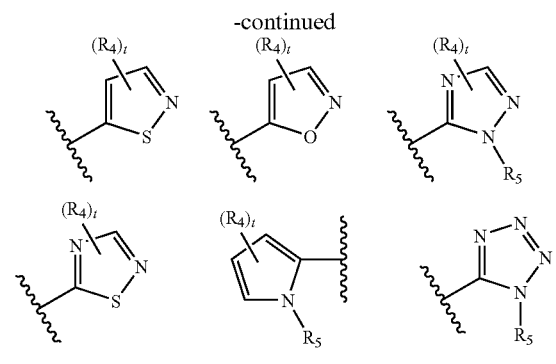

wherein:
R$_4$ is hydrogen or any non-metallic group;
t is an integer of 0-4; and
R$_5$ is hydrogen, or any substituted or unsubstituted aryl, alkenyl, alkynyl or alkyl group.

4. The aqueous ink of claim 1 wherein the compound of Formula 2 contains at least one ionizable group and is soluble in water at a level of 0.5% by weight or more.

5. The aqueous ink of claim 4 wherein said at least one ionizable group is selected from the group consisting of a sulfonic acid, a carboxylic acid, a sulfuric acid half ester, a sulfinic acid, or a combination thereof.

6. The aqueous ink of claim 1 wherein the colorant of Formula 2 does not contain an ionizable group and is dispersed in the ink as fine particles.

7. The aqueous ink of claim 6 wherein the ink comprises a colorant of Formula 2 and a dispersant at a level of 10-70% of the weight of the colorant.

8. The aqueous ink of claim 7 wherein the dispersant is a polymeric dispersant.

9. The aqueous ink of claim 1 wherein the ink also comprises a humectant at a level of at least 10% of the ink and no more than 40% of the ink 10. The aqueous ink of claim 1 wherein said colorant of Formula 2 is:

I-1

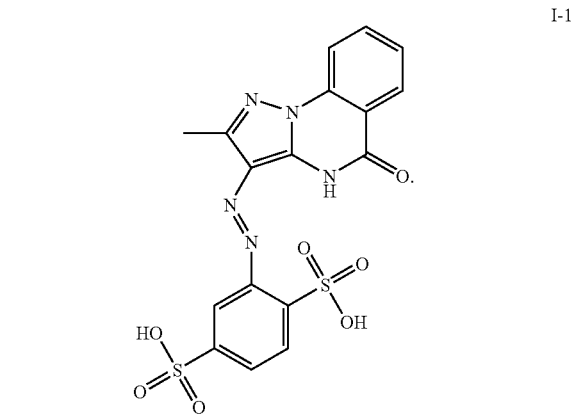

11. The aqueous ink of claim 1 wherein said colorant of Formula 2 is:

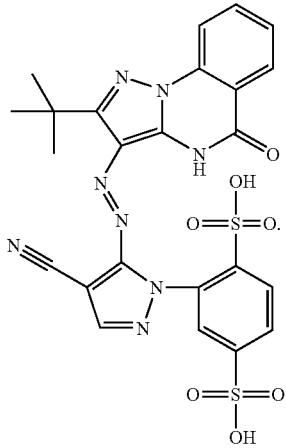

I-2

12. The aqueous ink of claim 1 wherein said colorant of Formula 2 is:

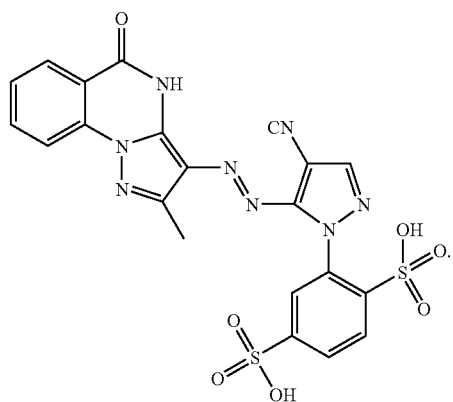

I-4

13. The aqueous ink of claim 1 wherein said colorant of Formula 2 is:

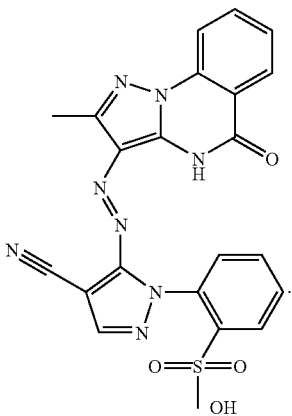

I-5

14. The aqueous ink of claim 1 wherein said colorant of Formula 2 is:

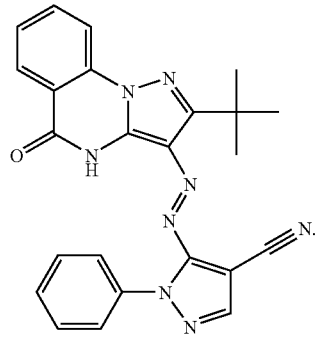

I-19

15. The aqueous ink of claim 1 wherein said colorant of Formula 2 is:

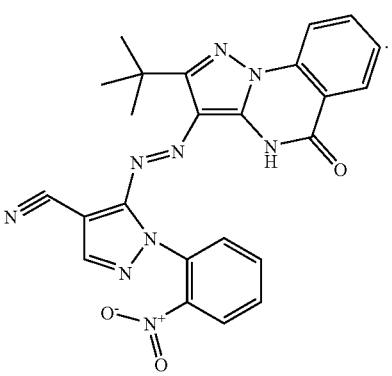

I-27

16. The aqueous ink of claim 1 wherein said colorant of Formula 2 is:

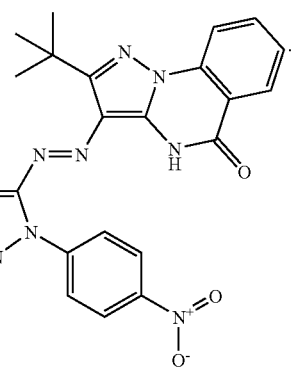

I-28

17. The aqueous ink of claim 1 wherein the ink further comprises a humectant at a level of at least 10% of the ink and no more than 40% of the ink.

18. The aqueous ink of claim 1 wherein said ink is an inkjet ink.

19. A printing method for creating an image on an ink compatible substrate comprising:

a. providing an apparatus with multiple addressable nozzles capable of ejecting ink droplets with three or more inks simultaneously;
b. loading said apparatus with an ink recording element comprising a support having thereon an image receiving layer;
c. loading said apparatus with a set of at least three inks of different colors to be printed by said apparatus wherein at least one of the inks contains a colorant of Formula I or Formula 2:

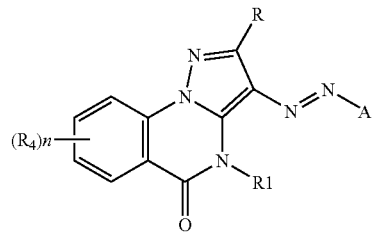

wherein: A is any substituted or unsubstituted aromatic or heteroaromatic moiety; R is hydrogen or any non-metallic group; R1 is hydrogen, or any substituted or unsubstituted aryl, alkenyl, alkynyl or alkyl group;

$R_4$ is hydrogen or any non-metallic group;

n is an integer of 0-4;

and, if n is 2-4, the $R_4$ groups may be the same or different from each other.

20. The printing method according to claim 19 wherein said set of at least three inks of different colors are a cyan colored ink, a magenta colored ink, and a yellow colored ink.

21. The printing method of claim 19 wherein said apparatus is an inkjet apparatus and said set of at least three inks of different colors are inkjet inks.

* * * * *